United States Patent [19]

Kawanabe

[11] Patent Number: 5,210,697
[45] Date of Patent: May 11, 1993

[54] NUMERICALLY CONTROLLED FEEDING APPARATUS HAVING FEEDING ERROR CORRECTING SYSTEM

[75] Inventor: Tasuku Kawanabe, Nagoya, Japan

[73] Assignee: Brother Kogyo Kabushiki Kaisha, Aichi, Japan

[21] Appl. No.: 647,230

[22] Filed: Jan. 29, 1991

[30] Foreign Application Priority Data

Jan. 30, 1990 [JP] Japan ................................... 2-19409

[51] Int. Cl.$^5$ ........................ G06F 15/46; G05B 19/18
[52] U.S. Cl. ................... 364/474.35; 318/571; 318/632; 364/474.31
[58] Field of Search ......... 364/167.01, 474.01–474.37, 364/176; 318/571, 572, 573, 632

[56] References Cited

U.S. PATENT DOCUMENTS

| | | | |
|---|---|---|---|
| 3,555,254 | 1/1971 | Gerber | 318/632 |
| 4,499,546 | 2/1985 | Kuga et al. | 364/474.35 |
| 4,503,373 | 3/1985 | Nozawa et al. | 364/474.35 X |
| 4,879,671 | 11/1989 | Rieder et al. | 364/562 |
| 4,942,611 | 7/1990 | Kunugi et al. | 364/474.06 |

*Primary Examiner*—Joseph Ruggiero
*Attorney, Agent, or Firm*—Oliff & Berridge

[57] ABSTRACT

A numerically controlled feeding apparatus having at least two linear feeding devices having intersected feeding directions includes a memory for storing beforehand representative correction vectors for representative instruction values indicating a predetermined number of reference feeding positions in the feeding space, each representative correction vector having information on deviation amount and deviation direction between a reference feeding position indicated by each of the representative instruction values and a real feeding position corresponding to each of the representative instruction value, a correcting unit for calculating a correction vector for an instruction value indicating any desired feeding position on the basis of a correction vector group of representative correction vectors for representative instruction values indicating plural feeding positions located in the neighborhood of the desired feeding position, and the instruction value indicating the desired feeding position, thereby to obtain a corrected feeding amount, and a control unit for controlling a feeding operation of the linear feeding devices on the basis of the corrected feeding amount.

7 Claims, 5 Drawing Sheets

NUMERICALLY CONTROLLED FEEDING APPARATUS HAVING FEEDING ERROR CORRECTING SYSTEM

BACKGROUND OF THE INVENTION

This invention relates to a numerically controlled feeding apparatus, and more particularly to a numerically controlled feeding apparatus having a correcting system for a mechanical motional error of the feeding apparatus.

A numerically controlled feeding apparatus has been used to feed various members such as a machining member, a cutting tool, a plotter or the like in one or higher dimensional direction. This numerically controlled feeding apparatus includes, for example, a feeding table for supporting the machining member or the like thereon, a guide surface for guiding the feeding table therealong, a ball thread for moving the feeding table on the guide surface; and other members. This type of feeding apparatus has been generally accompanied by a positioning or feeding error, which frequently occurs in a combined fashion of a pitch error of the ball thread, an unflatness error of the guide surface, an Abbe's error and so on.

In order to correct the positioning or feeding error as described above, there has been proposed a correcting device in which a difference in a feeding direction between an indicated position of a numerical position indicating device and a real position of the machining member or the like is stored as an error correcting value in a memory and then the error correcting value is added to an instruction value representing the indicated position to thereby control the movement of the machining member. This correcting device is described in Japanese Examined Published Patent Application No. 59-11125 and U.S. Pat. No. 3,555,254.

Figure 1:
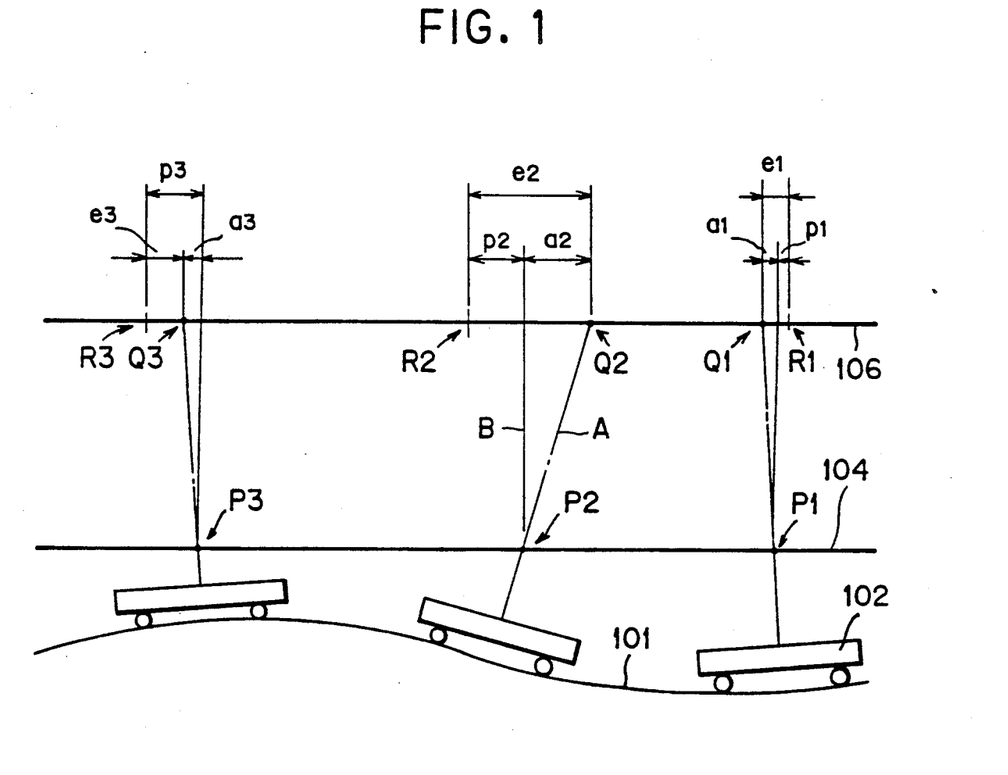
FIG. 1 is an explanatory diagram for explaining a feeding error and correcting the error in a conventional feeding apparatus.

FIG. 1 is an explanatory diagram for explaining the error correcting value as described above, particularly in a case where an uniaxial or one-dimensional linear feeding apparatus is used. As shown in FIG. 1, a feeding table 102 for mounting a machining member or the like thereon is provided in such a manner as to be movable on a guide surface 101, and fed along the guide surface 101 by a ball thread having a central axis 104 in accordance with an instruction value from the numerical position indicating device. In this case, a positioning or feeding control is carried out at each of positions P1, P2 and P3 on the central axial 104 of the ball thread whose direction corresponds to a feeding direction, in other words, the positioning is carried out at each of the stop positions Q1, Q2 and Q3 of the machining member or the like (not shown) on a position estimation surface (ordinarily, a surface of an object 106 to be machined).

As shown in FIG. 1, the stop positions Q1, Q2 and Q3 at which the machining member is really stopped on the estimation surface is not consistent with indicated positions R1, R2 and R3 at which the machine member is instructed, in advance, to be stopped because the pitch error, the Abbe's error, etc. occur. In this case, a difference in the feeding direction between each of the stop positions Q1, Q2 and Q3 and each of the corresponding indicated positions R1, R2 and R3 corresponds to each of positioning or feeding errors e1, e2 and e3 in the feeding direction.

The positioning errors e1, e2 and e3 occur in combined fashion with pitch errors p1, p2 and p3 of the ball thread, and the Abbe's errors a1, a2 and a3. The pitch error is caused by variation in pitch interval of the ball thread, and the Abbe's error is caused by deviation of a plane (A) vertical to the guide surface 101 from a plane B vertical to the feeding direction due to unflatness of the guide surface), in other words, by a meandering movement of the feeding table 102 on the vertical plane B. The positioning or feeding errors e1, e2 and e3 are measured beforehand and stored as error correction values.

In an uniaxial (one-shaft) linear feeding apparatus, a correcting operation is carried out by adding each error correction value to an instruction value representing each of the stop positions Q1, Q2 and Q3. Further, in the biaxial (two-shafts) linear feeding apparatus, the correcting operation is carried out every feeding direction for each shaft.

On the other hand, in the uniaxial linear feeding apparatus, the feeding error also occurs in a direction (Y-axis) intersected (for example, perpendicular) to the feeding direction (X-axis) due to the meandering (unevenness or unflatness) of the guide surface 101. That is, the meandering (unflatness) of the guide surface 101 in a feeding direction (axis) causes not only a feeding error in the direction, but also another feeding error in a direction intersected (for example, perpendicular) to the direction. In other words, a feeding operation on a feeding axis causes at least two feeding errors on the feeding axis and another feeding axis different therefrom (or intersected thereto).

In the conventional linear feeding apparatus having two or more feeding axes (shafts) which are intersected to each other at an angle, a feeding error on each feeding axis is independently corrected using a corrected feeding amount with respect to only the feeding axis although the feeding error on a feeding axis is caused by not only a feeding operation on the feeding axis, but also a feeding operation on another feeding axis, that is, the feeding errors on all the feeding axes are not autoerrors which are independent of one another, but correlated errors which are related to one another.

Accordingly, in the conventional numerically controlled feeding apparatus having at least two linear feeding devices whose feeding directions are intersected to each other, a feeding error of one linear feeding device which occurs in one feeding direction includes at least one component of a feeding error of the other feeding device (for example, an error component occurring on the Y-axis which is caused by the feeding operation on the X-axis), so that a feeding error in a feeding direction has a complicated mechanical error. However, this complicated mechanical error can not be completely corrected in the conventional feeding apparatus because each linear feeding device carries out a correcting operation for a feeding error (autoerror) thereof independently of the other feeding errors which are caused by the other linear feeding devices.

SUMMARY OF THE INVENTION

An object of this invention is to provide a numerically controlled feeding apparatus in which correlated feeding errors in all feeding directions or axes can be completely and accurately corrected to thereby perform a feeding operation with high accuracy.

In order to attain the above object, according to one aspect of this invention, a numerically controlled feeding apparatus comprises memory means for storing representative correction vectors for representative instruction values indicating a predetermined number of reference feeding positions in the feeding space, each representative correction vector having information on deviation amount and deviation direction between a reference feeding position indicated by each of the representative instruction values and a real feeding position corresponding to each of the representative instruction value, correcting means for calculating a correction vector for an instruction value indicating any desired feeding position on the basis of a correction vector group of representative correction vectors for representative instruction values indicating plural feeding positions located in the neighborhood of the desired feeding position, the correction vector group being read out of the memory means, and the instruction value indicating the desired feeding position, thereby to obtain a corrected feeding amount, and control means for controlling a feeding operation of the linear feeding devices on the basis of the corrected feeding amount.

According to another aspect of this invention, a method for performing a feeding operation of a numerically controlled feeding apparatus having at least two linear feeding devices while correcting an feeding error, comprises the steps of measuring beforehand and storing representative correction vectors for representative instruction values indicating a predetermined number of reference feeding positions in a feeding space, each representative correction vector having information on deviation amount and deviation direction between a reference feeding position indicated by each of the representative instruction values and a real feeding position corresponding to each of the representative instruction value, calculating a correction vector for an instruction value indicating any desired feeding position on the basis of a correction vector group of representative correction vectors for representative instruction values indicating plural feeding positions located in the neighborhood of the desired feeding position, and the instruction value indicating the desired feeding position, thereby to obtain a corrected feeding amount, and controlling a feeding operation of the linear feeding devices on the basis of the corrected feeding amount.

BRIEF DESCRIPTION OF THE INVENTION

DETAILED DESCRIPTION OF THE INVENTION

A preferred embodiment of this invention will be described hereunder with reference to the accompanying drawings.

Figure 2:
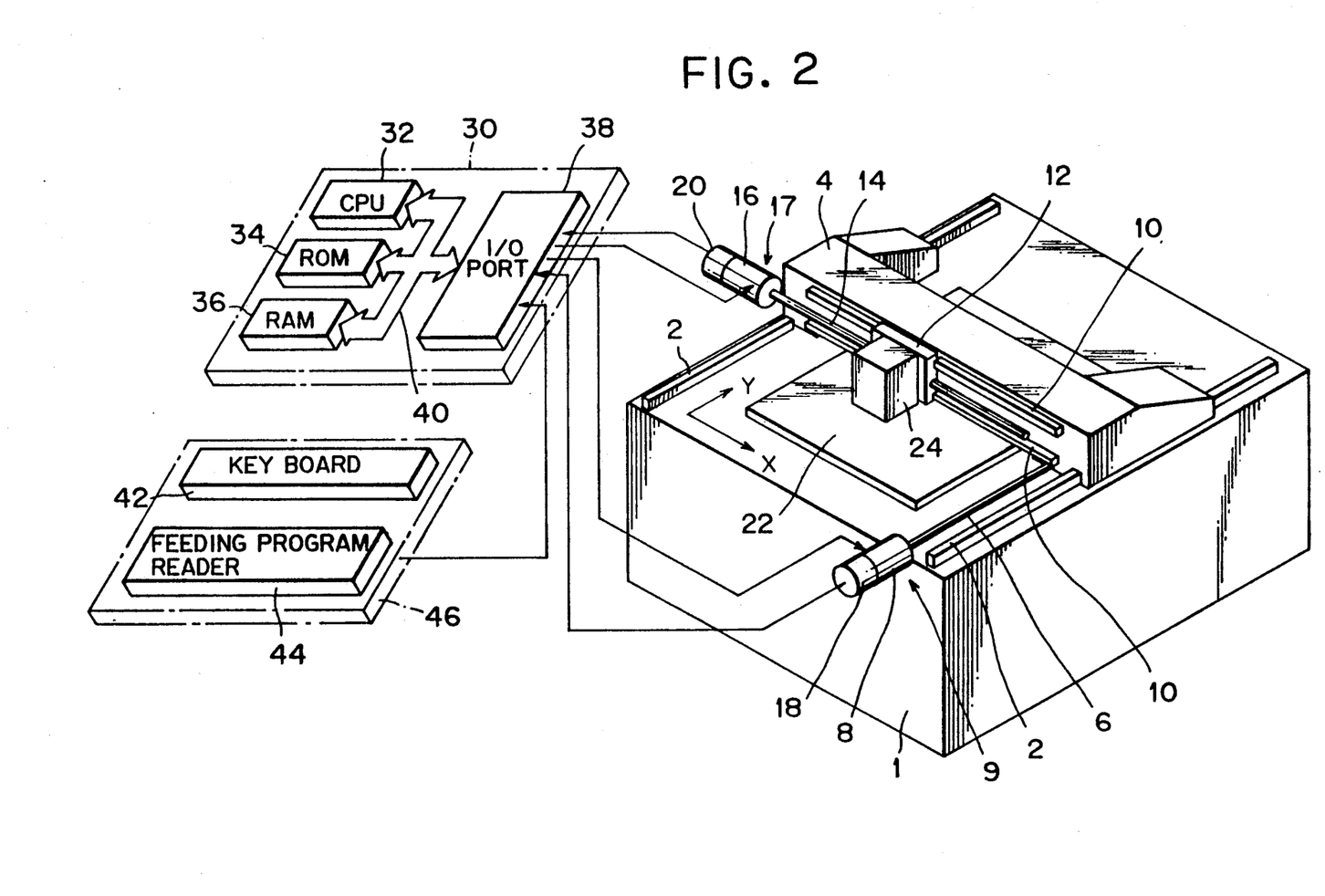
FIG. 2 is a perspective view of one embodiment of a numerically controlled feeding apparatus according to this invention.

FIG. 2 is a perspective view of one embodiment of a numerically controlled feeding apparatus according to this invention.

The numerically controlled feeding apparatus as shown in FIG. 2 is a gantry type of cross-feeding (X,Y-feeding) apparatus. The apparatus includes a machine bed 1 for mounting various members such as a machining head, a plotter or the like for performing a feeding operation, a pair of Y-axis guide members 2 extending in a Y-direction which is fixedly mounted on the machine bed 1, and a ball thread 6 which is rotatably mounted on the machine bed 1. The ball thread 6 is rotated by a servo motor 8 for the feeding operation of the Y-axis (hereinafter referred to as "Y-axis motor"). Further, a gantry 4 is mounted on the Y-axis guide members 2 in such a manner as to be movable slidably along the Y-axis guide members 2 (that is, in the Y-direction) through a rotational operation of ball thread 6 by the Y-axis motor 8. The Y-axis guide member 2, the gantry 4, the ball thread 6, and the Y-axis motor 8 constitute a Y-axis feeding device 9.

Further, a pair of X-axis guide members 10 extending in the X-direction perpendicular to the Y-direction is fixedly mounted on the gantry 4, and a table 12 is mounted on the X-axis guide members 10 in such a manner as to be slidably movable along the X-axis guide members 10. On the gantry 4 is rotatably mounted a ball thread 14, which is rotated by a servo motor 16 for the feeding operation of the X-axis (hereinafter referred to as "X-axis motor") to thereby move the table 12 in the X-direction. The X-axis guide member 10, the table 12, the ball thread 14, and the X-axis motor 16 constitute an X-axis feeding device 17. The Y-axis motor 8 and the X-axis motor 16 are connected to rotational angle detectors 18 and 20 for detecting respective rotational angles of the motors 8 and 16. An object 22 to be machined is provided on the machine bed 1, and a machining head 24 is fixedly provided on the table 12.

Still further, an electronic control circuit 30 is provided to control the feeding operation of the feeding apparatus and perform a correcting operation. The control circuit 30 includes a CPU 32 for performing an logical operation, a ROM 34 serving as a memory means for storing correcting vectors, etc. as described below, a RAM 36 for temporarily storing information and an input/output (I/O) port 38. These CPU 32, ROM 34, RAM 36 and I/O port 38 are connected through a bus 40 to one another.

The I/O port 38 is connected to the Y-axis motor 8, the X-axis motor 16, and the rotational angle detectors 18 and 20, and further connected to a numerical position indicating device 46 comprising a key board 42 for manually inputting information on a feeding amount of each feeding axis by an user and so on, and a feeding program reader 44 for reading out a numerical information on the feeding operation which is stored in the memory beforehand and contained in an instruction tape or the like. The numerical position indicating device 46 outputs an instruction value representing a desired feeding position on the basis of these informations.

The CPU 32 is inputted through the I/O port 38 with the instruction value of the numerical position indicating device 46, detection signals of the rotational angle detectors 18 and 20 and so on, and controls the feeding operation of the Y-axis motor 8, the X-axis motor 16, etc. on the basis of the above information, program and so on, thereby performing its feeding control operation.

Next, a setting operation of the correcting vectors to be stored in the ROM 34 will be described hereunder.

Figure 3:
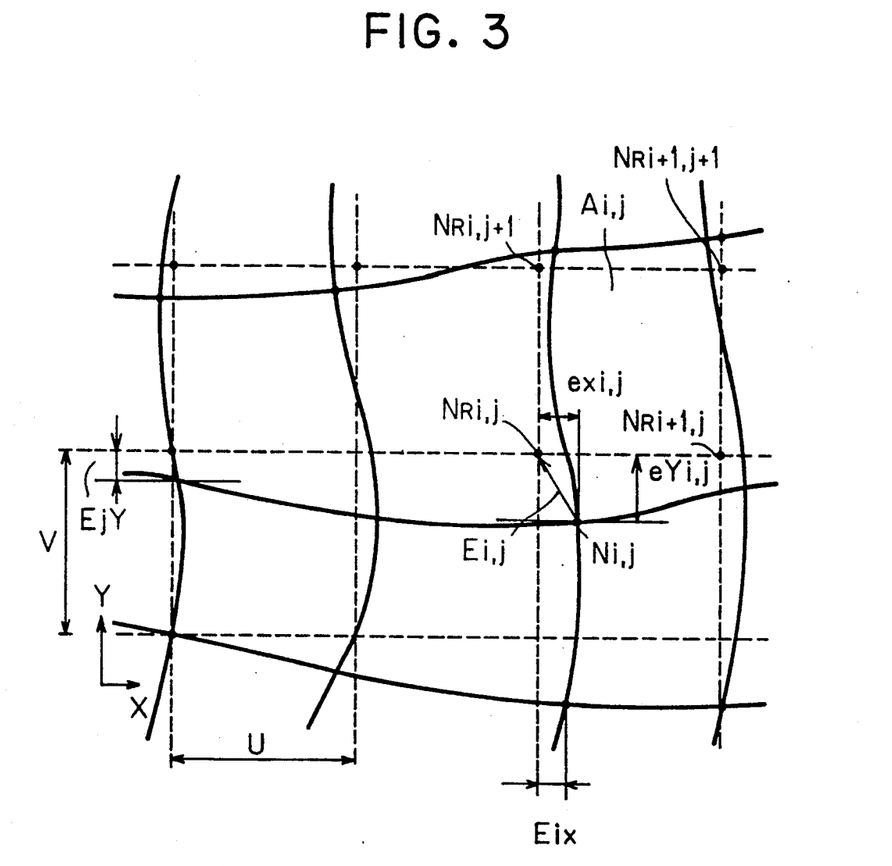
FIG. 3 is an explanatory diagram for showing a relationship between a feeding error and correcting vectors therefor when two linear feeding devices are used.

FIG. 3 is an explanatory diagram for showing a relationship between a feeding error and correcting vectors therefor when two linear feeding devices are used.

As shown in FIG. 3, the feeding operation is conceptively shown by using a two-dimensional feeding space compromising plural feeding axes or lines. In this case, it is assumed that X- and Y-axes which are perpendicular to each other are adopted as the feeding axes and the feeding space comprises grid-patterned feeding lines. In FIG. 3, dotted lines represent an instructed feeding direction of the machining head 24 along which the machining head 24 is instructed to be fed by an user or data stored beforehand in the memory, and solid lines represent a real feeding direction (locus) of the machining head 24 along which the machining head 24 is really fed without correction.

As shown in FIG. 3, two groups of dotted lines (hereinafter referred to as "X and Y instructed line groups") are assigned to the feeding space. The Y instructed line group comprises plural (m) dotted lines which are arranged in parallel with the Y-axis (direction) and at a predetermined interval (U) in the X-axis (direction), while the X instructed line group comprises plural (n) dotted lines which are arranged in parallel with the X-axis (direction) and at a predetermined interval (V) in the Y-axis (direction). These two groups of dotted lines are intersected to one another to form plural lattice points (hereinafter referred to as "instructed lattice points") at intersected points, which are used as representative feeding points for feeding the machining head 24 to any feeding point (position). In the following description, the machining head 24 is assumed to be fed in the feeding space.

In the feeding space, plural feeding areas Ai,j each of which is surrounded by four instructed lattice points NRi,j, NRi+1,j, NRi,j+1,and NRi+1,j+1 (i, j :any integer) are provided as shown in FIG. 3. The number of these areas is (m−1)(n−1), and the machining head 24 is moved over these (m−1)(n−1) areas by Y-axis feeding device 9 and the X-axis feeding device 17. The lattice intervals of U and V are beforehand stored in the ROM 34.

The CPU 32 outputs instruction values representing data on the X and Y instructed line groups to the X- and Y-axes feeding devices 17 and 9 to thereby move the machining head 24 to a desired position, that is , to perform a positioning or feeding operation of the machining head 24. However, practically, the machining head 24 is not straightly moved in the manner as instructed (along the dotted lines), and moved meanderingly on the object 22 as represented by the solid lines if not subjected to a feeding correction. This meandering line (or the meandering locus) is caused by not only a feeding error in the X-direction by the X-axis feeding device 17 and a feeding error in the Y-direction by the Y-axis feeding device 9, but also combination among an Abbe's error which is caused by the meandering of the Y-axis guide member 2 on the XY plane, a feeding error in the X-axis direction by the Y-axis feeding device 9, an Abbe's error which is caused by the meandering of the X-axis guide member 10 on the XY plane, an error in the Y-axis direction, and an intersecting error between the X and Y-axes. In the conventional feeding apparatus, only the former two errors have been corrected, while in this invention all of the above errors can be completely corrected.

A space comprising these meandering lines (X and Y meandering lines) is hereinafter referred to as "machine feeding space", and the machine feeding space includes plural lattice points at the intersecting points between the X and Y meandering lines. These lattice points of the machine feeding space is hereinafter referred to as "machine lattice points.

When the X-axis and Y-axis feeding devices are moved on the basis of an instruction value representing an instructed lattice point NRi,j, the machining head 24 is not really positioned at the instructed lattice position NRi,j, but is really positioned at the machine lattice point Ni,j which is deviated from the instructed lattice point by eXi,j in the X-axis direction and eYi,j in the Y-axis direction. These deviation amounts of eXi,j and eYi,j correspond to feeding errors in the X-axis and Y-axis directions, respectively. In order to correct the feeding errors, a correction vector Ei,j whose start and end points correspond to the machine lattice point Ni,j and the instructed lattice point NRi,j, respectively, is newly introduced, and stored in correspondence with an instruction value for each instructed lattice point. The correction vector Ei,j is represented by the following equation (1), and represents both of a deviation amount and a deviation direction between the machine lattice point Ni,j and the instructed lattice point NRi,j.

$$E_{i,j} = (eX_{i,j}\ eY_{i,j}) \tag{1}$$

Here, eXi,j and eYi,j are correction amounts in the X-axis direction and the Y-axis direction for the machine lattice point Ni,j, respectively. Further, the correction vectors for the machine lattice points over all the feeding areas are represented by the following matrix (2).

$$P = \begin{bmatrix} E1,n & \ldots & \ldots & \ldots & Em,n \\ \ldots & \ldots & \ldots & \ldots & \ldots \\ \ldots & \ldots & Ei,j & \ldots & \ldots \\ \ldots & \ldots & \ldots & \ldots & \ldots \\ E1,2 & E2,2 & \ldots & \ldots & \\ E1,1 & E2,1 & \ldots & Em,1 & \end{bmatrix} \tag{2}$$

This correction matrix is beforehand measured and stored in the memory, and used to obtain a correction vector for any desired feeding position.

The correction amount eXi,j of the correction vector Ei,j serves to correct not only the feeding error (eiX) of the X-axis feeding device 17 in the X-axis direction, but also the Abbe's error due to the meandering of the Y-axis guide member 2 on the XY plane and the feeding error in the X-axis direction which is caused by the Y-axis feeding device 9. Likewise, the correction amount eYi,j of the correction vector Ei,j serves to correct not only the feeding error (ejY) of the Y-axis feeding device 9 in the Y-axis direction, but also the Abbe's error due to the meandering of the X-axis guide member 10 on the XY plane and the feeding error in the X-axis direction which is caused by the Y-axis feeding device 17.

An arithmetic operation of the CPU 32 for obtaining correction vectors for any points in the feeding areas will be hereunder described with reference to FIG. 4.

Figure 4:
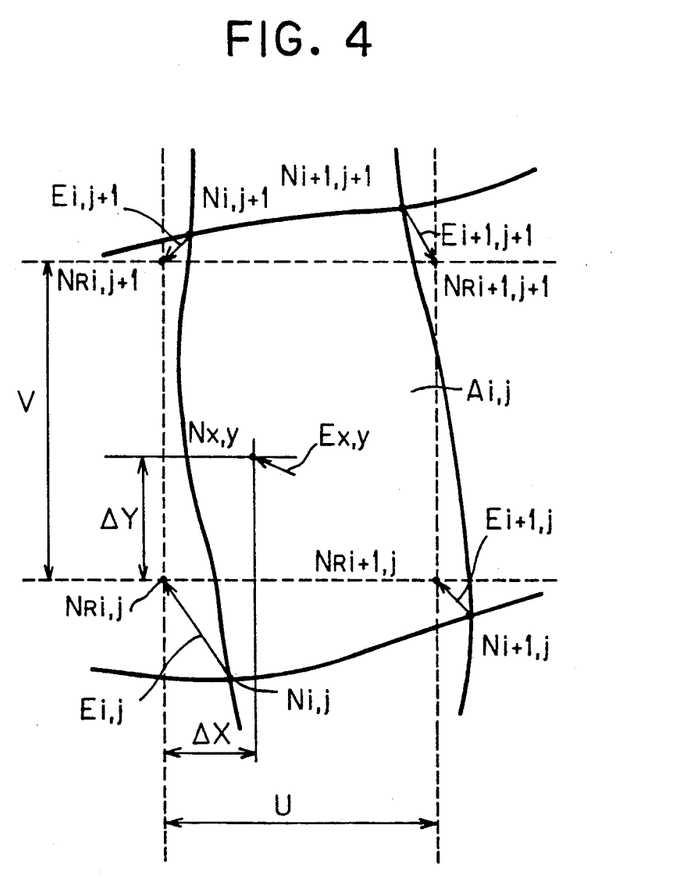
FIG. 4 is a partly-enlarged view of the feeding areas as shown in FIG. 3.

FIG. 4 is a partly-enlarged view of the feeding areas as shown in FIG. 3. A correction vector at any point Nx,y in the feeding areas can be calculated using four correction vectors for four instructed lattice points of a feeding area to which the point Nx,y belongs. For example, assuming that the point Nx,y belongs to the feeding area Ai,j, the correction vectors for the instructed lattice points NRi,j, NRi+1,j, NRi,j+1 and NRi+1,j+1 of the feeding area Ai,j including the point Nx,y are represented by Ei,j, Ei+1,j, Ei,j+1, and Ei+1,j+1, and $\Delta X$ and $\Delta Y$ represent distances in the X-axis and Y-axis directions between the instructed lattice point NRi,j and the point Nx,y, respectively, the correction vector Ex,y for the point Nx,y which is numerically input from the numerical position indicating device 46 is interpolatively calculated and represented by the following equation (3)

$$Ex,y = (1 - \alpha)(1 - \beta)Ei,j + \alpha \cdot (1 - \beta)Ei + 1,j + \quad (3)$$
$$(1 - \alpha) \cdot \beta \cdot Ei,j + 1 + \alpha \cdot \beta \cdot Ei + 1,j + 1$$

Here,
$$\alpha = \Delta X/U, \text{ and} \quad (4)$$
$$\beta = \Delta Y/V \quad (5)$$

When the point Nx,y is consistent with the instructed lattice point NRi,j, the correction vector Ei,j for the point NRi,j 1 is one for the point Nx,y. When the point Nx,y is not consistent with the instructed lattice point NRi,j, a correction vector for any point can be interpolatively calculated using the correction vectors Ei,j, Ei+1,j, Ei,j+1 and Ei+1,j+1 for the four instructed lattice points NRi,j, NRi+1,j, NRi,j+1 and NRi+1,j+1 with high accuracy.

The above description is made to the arithmetic operation of the correction vectors for the two-dimensional feeding space. However, the similar arithmetic operation can be also applied to higher-dismensional feeding spaces than the two-dimensional feeding space. For example, when a three-dimensional orthogonal feeding space is introduced using X-axis, Y-axis and Z-axis feeding devices, all correction vectors Ei,j,k for all instructed lattice points in the three-dimensional feeding space which are represented by the following equation (6) are beforehand stored in the ROM 34. The correction vector matrix P for all the instructed lattice points is represented by the following equation (7).

$$Ei,j,k = (eXi,j,k \; eYi,j,k \; eZi,j,k) \quad (6)$$

$$P = (Ei,j,k), \; 1 \leq i \leq m, \; 1 \leq j \leq n, \; 1 \leq k \leq 0 \quad (7)$$

A correction vector Ex,y,z for any point Nx,y,z is represented by the following equation (8) using the equations (6) and (7).

$$Ex,y,z = (1 - \alpha)(1 - \beta)(1 - \gamma)Ei,j,k + \quad (8)$$
$$\alpha \cdot (1 - \beta)(1 - \gamma)Ei + 1,j,k + (1 - \alpha) \cdot \beta \cdot (1 - \gamma)Ei,j +$$
$$1,k + (1 - \alpha)(1 - \beta) \cdot \gamma \cdot Ei,j,k + 1 + \alpha \cdot \beta \cdot (1 - \gamma)Ei +$$
$$1,j + 1,k + (1 - \alpha) \cdot \beta \cdot \gamma \cdot Ei,j + 1,K + 1 + \alpha \cdot (1 - \beta) \cdot$$
$$\gamma \cdot Ei + 1,j,k + 1 + \alpha \cdot \beta \cdot \gamma \cdot Ei + 1,j + 1,k + 1$$

Here,
$$\alpha = \Delta X/U, \quad (9)$$
$$\beta = \Delta Y/V, \quad (10)$$
$$\gamma = \Delta Z/W \quad (11)$$

Here, $\alpha = \Delta X/U$ (9), $\beta = \Delta Y/V$ (10), $\gamma = \Delta Z/W$ (11) U, V and W represent lattice intervals in the X, y and Z directions, respectively.

Figure 5:
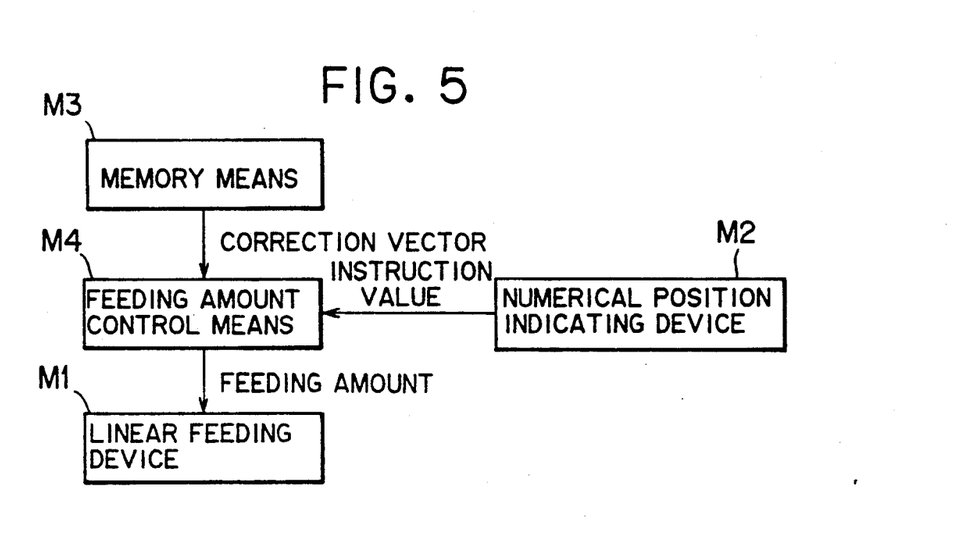
FIG. 5 is a block diagram for an error correcting device used in the numerically controlled feeding apparatus according to this invention.

FIG. 5 is a block diagram for showing an embodiment of the correcting device used in the numerically controlled feeding apparatus according to this invention.

The correcting device as shown in FIG. 5 includes at least two linear feeding devices M1 for linearly feeding the machining head in directions intersected to each other, a memory means for storing correction vectors beforehand each of which represents deviation amount between an instructed lattice point and a machine lattice point corresponding thereto, a numerical position indicating device M2 for outputting an instruction value representing a desired position at which the machining head is fed, and a feeding amount control means M4 for receiving the instruction value from the numerical instruction device M2 to feed the machining head to the position represented by the instruction value, and calculating a corrected feeding amount on the basis of the instruction value and the correct (on vector stored in the memory means M3 to feed the machining head by the corrected feeding amount and dispose it to the desired position.

Figure 6:
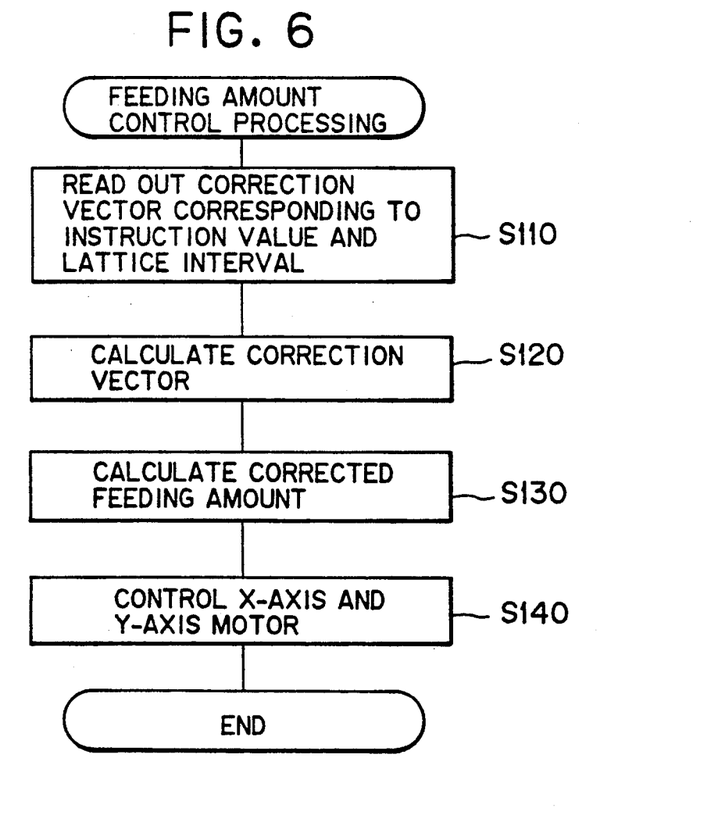
FIG. 6 is a flowchart for showing an error correcting operation.

A control processing of a feeding operation by the control circuit 30 will be next described hereunder in accordance with a flowchart as shown in FIG. 6, particularly in a case where the two-dimensional feeding space is adopted.

Upon output of an instruction value representing a desired feeding position Nx,y from the numerical position indicating device 46, four correction vectors Ei,j, Ei+1,j, Ei,j+1, and Ei+1,j+1 for four instructed lattice points NRi,j, NRi+1,j, NRi,j+1 and NRi+1,j+1 in a feeding area Ai,j which includes the position Nx,y, and the lattice intervals U and V are read out of the ROM 34 serving as the memory means M3 (step S110). Thereafter, coefficients $\alpha$ and $\beta$ are calculated by the equations (4) and (5), and a correction vector Ex,y for the position Nx,y corresponding to the instruction value is calculated by the equation (3) (step S120).

The correction vector Ex,y thus calculated is added to the instruction value to obtain a corrected feeding amount (step S130). Thereafter, the Y-axis motor 8 and the X-axis motor 16 is controlled to move the machining head 24 by the corrected feeding amount and dispose it to the position Nx,y on the object 22 while rotational angles of the Y-axis motor 8 and the X-axis motor 16 are detected by the rotational angle detectors 18 and 20, respectively, and detection signals of the detectors 18 and 20 are fed back (step S140).

According to the numerically controlled feeding apparatus of this invention, correction vectors Ei,j whose start and end points correspond to machine and instructed lattice points Ni,j and NRi,j are measured beforehand and determined for all instruction values corresponding to all instructed lattice points NRi,j. Thereafter, any correction vector Ex,y for any instruction value indicating any feeding point Nx,y which is outputted from the numerical position indicating device 46 is calculated on the basis of the following eight parameters: four correction vectors Ei,j, Ei+1,j, Ei,j+1 and Ei+1,j+1 for four instructed lattice points NRi,j, NRi+1,j, NRi,j+1 and NRi+1,j+1 at a feeding area Ai,j including the point Nx,y, distances (deviations) x and y in the X-axis and Y-axis directions between the instructed lattice point NRi,j and the feeding point Nx,y, indicated by the instruction value, and the intervals U and V of the feeding space. The calculated correction vector Ex,y is added to the instruction value to obtain a corrected feeding amount and then the X-axis and Y-axis motors 8 and 16 are controlled on the basis of the corrected feeding amount. Accordingly, the correction amount(component) $eX_{i,j}$ in the X-axis direction of the correction vector $E_{i,j}$ for the instructed lattice point $N_{i,j}$ covers not only feeding error $\epsilon iX$ in the X-axis direction by the X-axis feeding device 17, but also another feeding error $\epsilon iY$ in the X-axis direction by the Y-axis feeding device 9. Likewise, the correction amount(component) $eY_{i,j}$ in the Y-axis direction of the correction vector $E_{i,j}$ for the instructed lattice point $N_{i,j}$ covers not only feeding error $\epsilon jY$ in the Y-axis direction by the Y-axis feeding device 9, but also another feeding error $\epsilon jX$ in the X-axis direction by the Y-axis feeding device 17. Therefore, not only auto-feeding errors of the X-axis and Y-axis feeding devices 17 and 9, respectively, but also a correlative feeding error between these feeding devices 17 and 9 can be corrected to thereby perform a correcting operation with high accuracy, so that feeding and positioning controls are carried out with high accuracy.

This invention is not limited to the above embodiment, and any modification may be made to the embodiment without departing from the subject matter of this invention. For example, the above embodiment was described for the two-dimensional feeding apparatus, however, this invention may be applied to a higher-dimensional feeding apparatus. Further, this invention may be applied not only to an intermittent positioning control for merely performing a positioning operation between at least two points, but also performing a continuous positioning control of a specific locus (outline) between the points at a predetermined rate. In this case, the locus (outline) is divided into plural fine vectors and then each vector is subjected to a correcting operation.

What is claimed is:

1. A numerically controlled feeding apparatus having at least two linear feeding devices having intersected feeding directions for performing a numerical feeding control in a feedign space defining a plurality of feeding areas on the basis of an instruction value representing a desired feeding position, comprising:

memory means for storing representative correction vectors for representative instruction values indicating a predetermined number of reference feeding positions in the feeding space, each representative correction vector having information on deviation amount and deviation direction between a reference feeding position indicated by each of the representative instruction values and a real feeding position corresponding to each of the representative instruction values, the deviation amount and deviation direction being indicative of an error of each said linear feeding device caused by at least one component of a feeding error of the other feeding devices;

correcting means for calculating a correction vector for an instruction value indicating any desired feeding position on the basis of a correction vector group of representative correction vectors for representative instruction values indicating plural feeding positions located in adjacent feeding areas of the desired feeding position, the correction vector group being read out of said memory means, and the instruction value indicating the desired feeding position, thereby to obtain a corrected feeding amount; and control means for controlling a feeding operation of said linear feeding devices on the basis of the corrected feeding amount.

2. The numerically controlled feeding apparatus as claimed in claim 1, wherein said reference feeding positions correspond to cross points between two line groups including predetermined numbers of lines in parallel with the intersected feeding directions, respectively.

3. The numerically controlled feeding apparatus as claimed in claim 2, wherein said two line groups comprise a grid pattern.

4. The numerically controlled feeding apparatus as claimed in claim 1, further comprising feeding amount detecting means for detecting feeding amounts of said linear feeding devices to output a detection result to said control means to thereby perform the feeding operation with feedback.

5. The numerically controlled feeding apparatus as claimed in claim 1, wherein each of said linear feeding devices comprises a ball thread and a servo motor for rotating said ball thread.

6. The numerically controlled feeding apparatus as claimed in claim 5, further comprising rotational angle detecting means for detecting a rotational angle of said servo motor to thereby detect a feeding amount of each of said linear feeding devices.

7. A method for performing a feeding operation of a numerically controlled feeding apparatus having at least two linear feeding devices while correcting a feeding error, comprising the steps of:

measuring and storing representative correction vectors for representative instruction values indicating a predetermined number of reference feeding positions in a feeding space defining a plurality of feeding areas, each representative correction vector having information on deviation amount and deviation direction between a reference feeding position indicated by each of the representative instruction values and a real feeding position corresponding to each of the representative instruction values, the deviation amount and deviation direction being indicative of an error of each said linear feeding device caused by at least one component of a feeding error of the other feeding devices;

calculating a correction vector for an instruction value indicating any desired feeding position on the basis of a correction vector group of representative correction vectors for representative instruction values indicating plural feeding positions located in adjacent feeding areas of the desired feeding position, and the instruction value indicating the desired feeding position, thereby to obtain a corrected feeding amount; and controlling a feeding operation of the lienar feeding devices on the basis of the corrected feeding amount.

* * * * *